(12) United States Patent
Duca et al.

(10) Patent No.: US 6,654,538 B2
(45) Date of Patent: Nov. 25, 2003

(54) TECHNIQUE FOR REALIZING ATTENUATORS FOR OPTICAL FIBERS WITH ATTENUATING FIBER

(75) Inventors: Lucio Duca, Garbagnate Milamese (IT); Giuseppe Manfredda, Garbagnate Milamese (IT)

(73) Assignee: Optotec S.P.A., Gabagnate Milanese (IT)

( * ) Notice: Subject to any disclaimer, the term of this patent is extended or adjusted under 35 U.S.C. 154(b) by 59 days.

(21) Appl. No.: 10/083,295

(22) Filed: Feb. 27, 2002

(65) Prior Publication Data

US 2002/0176686 A1 Nov. 28, 2002

(30) Foreign Application Priority Data

Apr. 12, 2001 (IT) .................................... RM2001A0201

(51) Int. Cl.[7] .................................................. G02B 6/00
(52) U.S. Cl. ........................ 385/140; 385/126; 385/127
(58) Field of Search .................. 385/140, 126, 385/127

(56) References Cited

U.S. PATENT DOCUMENTS

| 5,633,974 A | * | 5/1997 | Chia | 385/140 |
| 2002/0106181 A1 | * | 8/2002 | Han et al. | 385/142 |

FOREIGN PATENT DOCUMENTS

IT   WO-99/44085 A1 * 9/1999 ............ G02B/6/26

* cited by examiner

*Primary Examiner*—Brian Healy
*Assistant Examiner*—Kevin S Wood
(74) *Attorney, Agent, or Firm*—Young & Thompson

(57) ABSTRACT

The attenuator for optical fibers with attenuating fiber according to the present invention comprises an optical fiber having a profile of reflective index with partially depressed cladding, of a length equal to the one of the whole attenuator, drugged with chemical substances like ions of transition metals and elements of rare earth, for creating a uniform spectral attenuation in the field of wavelengths between 1260 nm to 1650 nm.

6 Claims, 3 Drawing Sheets

TECHNIQUE FOR REALIZING ATTENUATORS FOR OPTICAL FIBERS WITH ATTENUATING FIBER

The present invention concerns an improvement for supplying an easy and new technique for realizing compact optical attenuators with a reply independent from the wavelength.

The prior art shows the following two documents: U.S. Pat. No. 5,633,974, of Mar. 31, 1995, "All fibre attenuator", of Shin-Lo Chia; and WO99/44085 of Sep. 2, 1999, "Optical fibre attenuators assembled using attenuating fibre", of Optotec S.p.A./Egisto Edera; all based on the use of a portion of attenuating fibre, spliced with a standard fibre, and the attenuation independence degree thereof from the wavelength is not very high due to a determined and unavoidable modal interference that arises between the two connections and the blowout joints. Both cited documents describe techniques for limiting the power linked to the upper mode that interferes with the fundamental mode, like the etching of the attenuating fibre portion of the first one or the control of the leak of the blowout joints of the second one, but there always remains a certain interference which may be harmful. Furthermore, the techniques described in said documents allow to realize attenuators with parts of different fibres spliced between each other, which could show problems of reliability, specially the one mentioned in the Chia-document, wherein the diameter of the attenuated fibre is chemically reduced and thus becomes more fragile and subject to the arising of microcracks.

The present invention is based on the use of an optical fibre with a high intrinsic attenuation and with geometric features similar to those of a standard optical fibre and with all consequent advantages; at the same time, it reduces the disadvantages of the two mentioned patents and also allows to obtain a compact attenuator by means of a simple and cheap process.

The present invention will be described more in detail in the enclosed drawings.

FIG. 1 shows the state of the refractive index of the attenuated fibre according to the distance from the centre of the fibre, wherein the central rectangular area a1 of the beam and with a high refractive index n1 shows the core of the fibre, while the lateral areas show the cladding that may be divided into two parts: the intermediate area a2-a1 is a more internal cladding with a lower refractive index, while the outer area shows an outer cladding with a higher refractive index.

Figure 1:
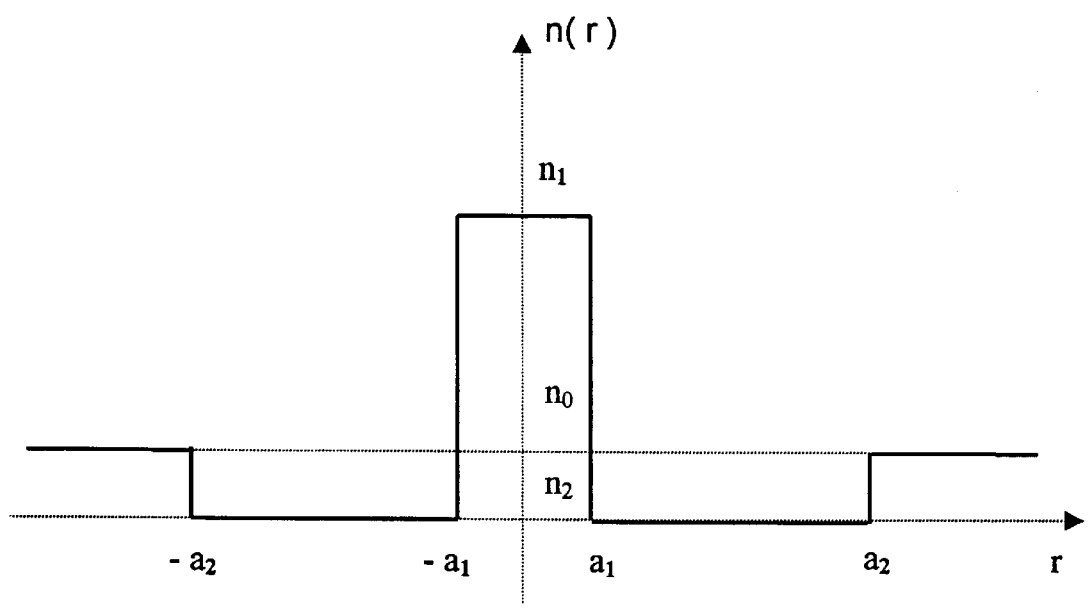
Figure 2:
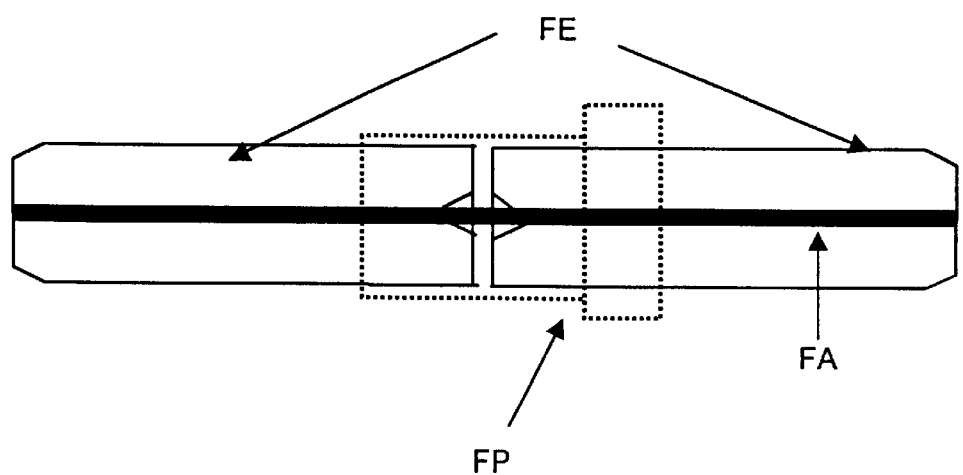
FIG. 2 shows an attenuating body, as it is in reality, consisting of two standard rods FE kept together by an alignment and positioning flange FP and containing an attenuating fibre FA; the rod is a baked clay cylinder with a high precision hole that houses the fibre.
Figure 3:
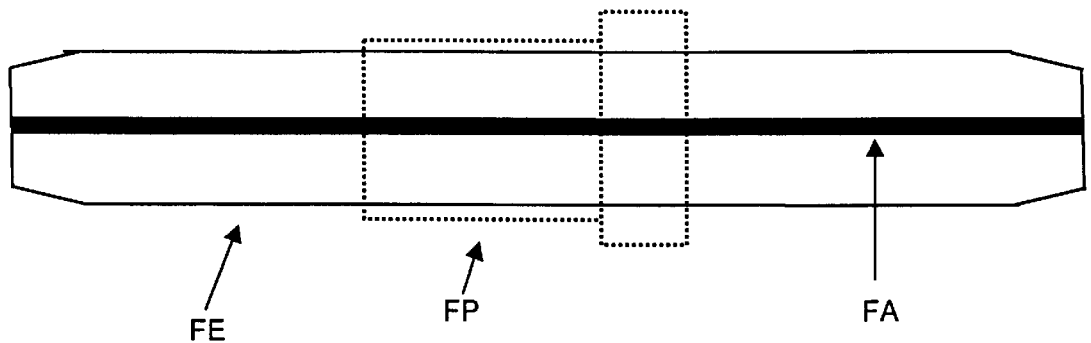
FIG. 3 shows an attenuating body consisting of one single rod FE containing the attenuating fibre FA inserted in a flange for the positioning FP of the body into the attenuator.
Figure 4:
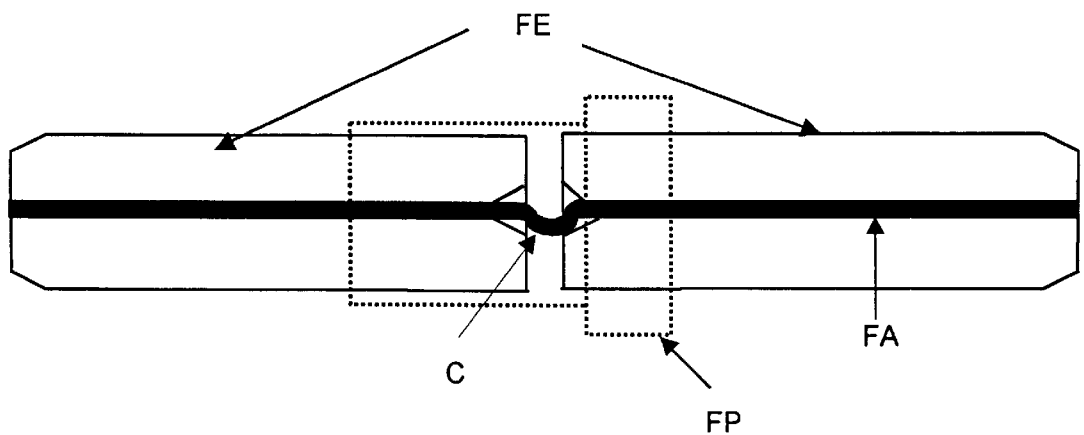
FIG. 4 is similar to FIG. 2, but the attenuating fibre has a light bending C at the union point of the two rods.

The enclosed figures describe an attenuator for optical fibres based on the fact that if the optical fibre is drugged with special chemical substances like, e.g., transition elements, elements of rare earth, strong absorption bands may be introduced into the transmission spectrum and these bands reduce the transmissibility of such an amount that grows with the increase of the entity of the products introduced into the glass matrix. Furthermore, by opportunely dosing the amount of drugs introduced it is possible to obtain a controlled attenuation of the fibre with a reduced dependency from the wavelength in the band interesting for telecommunications (1260–1600 nm). In spite of this, as the fundamental mode is strongly attenuated, it is easier with this kind of fibre than with standard mono-mode fibres, for modal interference effects to arise. However, if the attenuating fibre has a profile of reflective index of the kind shown in FIG. 1, with an internal cladding part with a diameter greater than twice the one of the core, with a lower index profile and a remaining external cladding part with a higher reflective index than the internal one, it is possible to reduce the influence of the superior modes and consequently to minimize the interference effect with the fundamental mode.

In fact, the attenuator according to the present invention consists of a portion of attenuated fibre, like the one described, of a length equal to the total length of the attenuator and with such an intrinsic attenuation as to supply, on such distance, the desired attenuation.

The assembling operation of the attenuating fibre into the attenuating body are similar to those already described in document WO 99/44085, comprising the lapping of the two ends of the attenuating body and the final assembling in an external body, compatible with the best known and used connectors.

As already mentioned in WO 99/44085, the presence of a controlled stress on the central area of the attenuated fibre may be intentionally introduced for the purpose of improving the spectral response of the attenuator at wavelengths over 1580 nm (specially between 1580 and 1650 nm). The stress consists of a light bending of the optical fibre that determines an increase of the attenuation at high wavelengths, thus balancing the sharp reduction of the spectral attenuation of the attenuated fibre in this area. This allows to make even more flat the spectral response of the attenuator even in the field of higher wavelengths, where usually the monitoring of the telecommunication nets is performed.

Figure 5:
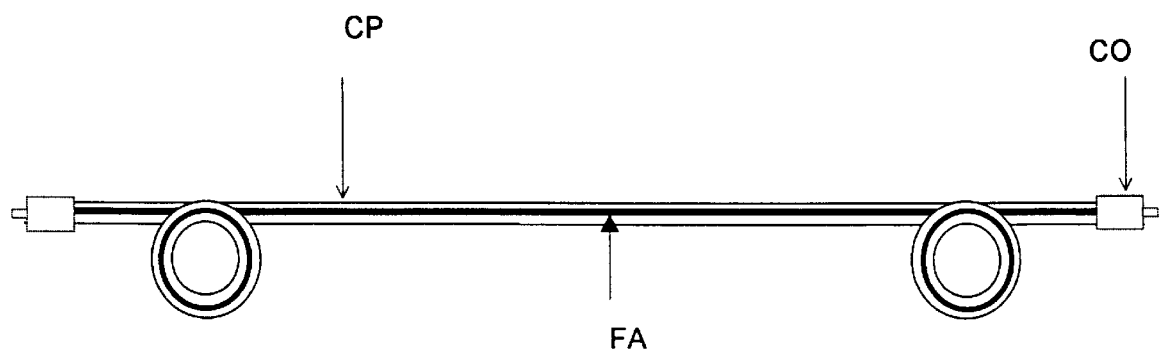
FIG. 5 shows a optical fibre cable with protection cords CP containing inside an attenuating fibre FA, said cable being provided with a connector CO on both ends.

As an alternative to the compact attenuator, the attenuated fibre may be assembled and protected in a special tube in turn contained in a small mono-fibre cable, as shown in FIG. 5, and in this case an attenuating cord is realized that may be ended with optical connectors, like a common cord.

The present invention may be described as follows:

property of the attenuated fibre: the presence of a "depressed" cladding with a reflective index of opportune dimensions and lower than the ones of the core, allows to considerably increase the cut-off normalized frequency of the higher modes with respect to the oe of SM fibres with a single cladding and consequently the attenuation of the higher mode, with the same wavelength. In fact, when—in a fibre with a W-shaped index profile—the wavelength is greater than the cut-off length of the first mode of higher level LP11, the radiation loss of such mode (in this case called leaky mode) is:

$$2\alpha = \frac{8\kappa^3 \sigma_0 \varsigma^2 e^{-2\varsigma(a2-a1)}}{n_0(n_1^2 - n_2^2)(n_0^2 - n_2^2)k^5[(\kappa a_1)^2 - v^2]^{1/2}}$$

where:
$\kappa = (n_1^2 k^2 - \beta^2)^{1/2}$ is the transverse component of the propagation vector in the core;

$\zeta = (\beta^2 - n_0 k^2)^{1/2}$ is the transverse decay parameter in the cladding;

$\beta$ is the phase constant in the guided modes;

$\sigma_0 = n_0 k^2 - \beta^2$;

$n_1$ is the reflective index of the core;

$n_2$ is the reflective index of the internal cladding;

$n_0$ is the reflective index of the external cladding;

$k = 2\pi/\lambda$;

$a_1$ is the radius of the core;

$a_2$ is the radius of the external cladding.

The parameters $\kappa$ and $\zeta$ are the ones corresponding to a step fibre with a standard index of a beam $a_1$ with $a_2 \to \infty$.

When the relationship $a_2/a_1$ increases, the attenuation $2\alpha$ of the higher mode LP11 decreases, maintaining all other parameters, until it reaches the minimum when the relationship $\to \infty$ because $a_2 \to \infty$, reaching the condition of a standard index step fibre.

Therefore, by duly choosing the relationship $a_2/a_1$, it is possible to obtain the desired attenuation; however, it is important to maintain the beam of the core as near as possible to the one of standard mono-mode fibres, so as to minimize the leaks due to connection.

The reflective index of the external cladding $n_o$ only has a light influence onto the propagation of the modes, but it improves the restriction of the fundamental mode and facilitates the blow-out of the cladding modes.

Therefore, such a fibre considerably reduces the problems of modal interference.

Calculation of the intrinsic attenuation of the attenuated fibre: if $\alpha$ is the attenuation for length unit of the attenuating fibre, $\alpha_{c1}$ and $\alpha_{c2}$ is the attenuation of the two connections and the attenuation supplied by the attenuator, without the contribution of the bending, is the following:

$$A = \alpha l + \alpha_{c1} + \alpha_{c2} \text{ [dB]},$$

where l is the length of the portion of attenuating fibre. Therefore, $\alpha$ shall be:

$$\alpha = (A - \alpha_{c1} - \alpha_{c2})/l \text{ [dB/m]}.$$

The attenuation $A_b$ of the bending—when present—must be added to the total attenuation, and the expression taken from Snyder: *Optical Waveguide Theory*, 1983, for very great $a_2/a_1$, is:

$$A_b = 4,34 \cdot \left\{ 2\left(\frac{a_1}{R}\right)^2 \left(\frac{r_0}{a}\right)^6 \frac{V^4}{8\Delta^2} + \left[\frac{\pi^{1/2}}{2a_1}\left(\frac{a_1}{R}\right)^{1/2} \frac{V^2 W^{1/2}}{U^2} e^{-\frac{4}{3}\frac{R}{a_1}\frac{W^3 \Delta}{V^2}}\right] \cdot \pi R \right\} \text{[dB]}$$

where:

$a_1$ is the radius of the beam of the core;

$r_0$ is the beam of the modal field;

R is the radius of the bending, presumed constant;

$\Delta$ is the numeral opening;

V is the normalized frequency;

U is the normalized phase parameter;

$W = (V^2 - U^2)^{1/2}$.

The advantages of the technique according to the present invention with respect to those that make use of attenuated fibres spliced with standard mono-modal fibres may be resumed as follows:

the use of one single portion of attenuated fibre for the whole length of the attenuator, with such an intrinsic attenuation as to supply the desired attenuation and avoid harmful and unreliable fusion splicing operation with standard mono-modal fibre;

the use of an attenuated fibre with double cladding, whereby the internal one has a lower (depressed) reflection index with respect to the external one, that allows to considerably reduce the modal interference.

What is claimed is:

1. A compact optical attenuator, characterized in the use of an optical fibre of a length equal to the one of the whole attenuator, drugged with chemical substances like ions of transition metals and elements of rare earth, for creating a spectral attenuation sufficiently uniform in the field of wavelengths from 1260 nm to 1650 nm.

2. A compact optical attenuator according to claim 1, characterized in the use of said attenuated fibre with reflection index with a partially "depressed" cladding sufficiently great, such as to intrinsically attenuate the modes of higher level and to facilitate the elimination thereof in the most external cladding, as said fibre strongly reduces the modal interference and makes more uniform the spectral response of the attenuator in the field of the wavelengths according to claim 1.

3. An optical attenuator with a cord provided with connectors, characterized in that it contains an attenuated optical fibre according to claim 1, for the whole length thereof.

4. An optical attenuator according to claim 1, characterized in the presence of a controlled bending on the attenuated fibre for "straightening" the spectral feature of the attenuation towards the high wavelengths (between 1580 nm and 1650 nm), where the intrinsic attenuation of the attenuated fibre usually quickly dacays.

5. An optical attenuator according to claim 1, characterized in the presence of an attenuating cord provided with connectors.

6. An optical attenuator according to claim 1, characterized in the presence of an attenuating cord not provided with connectors.

* * * * *